US008478080B2

(12) United States Patent
Springmann et al.

(10) Patent No.: US 8,478,080 B2
(45) Date of Patent: Jul. 2, 2013

(54) SECURING OF DOCUMENTS BY MEANS OF DIGITAL WATERMARK INFORMATION

(75) Inventors: Edward Springmann, Berlin (DE); Manfred Paeschke, Wandlitz (DE); Oliver Muth, Berlin (DE)

(73) Assignees: Bayer Material Science AG, Leverkusen (DE); Bundesdruckerei GmbH, Berlin (DE)

( * ) Notice: Subject to any disclaimer, the term of this patent is extended or adjusted under 35 U.S.C. 154(b) by 433 days.

(21) Appl. No.: 12/740,736

(22) PCT Filed: Oct. 31, 2008

(86) PCT No.: PCT/EP2008/009337

§ 371 (c)(1),
(2), (4) Date: Aug. 9, 2010

(87) PCT Pub. No.: WO2009/056353

PCT Pub. Date: May 7, 2009

(65) Prior Publication Data

US 2011/0007934 A1 Jan. 13, 2011

(30) Foreign Application Priority Data

| | | | |
|---|---|---|---|
| Oct. 31, 2007 | (DE) | ......................... | 10 2007 052 947 |
| Dec. 7, 2007 | (DE) | ......................... | 10 2007 059 746 |
| Dec. 7, 2007 | (DE) | ......................... | 10 2007 059 747 |
| Feb. 29, 2008 | (DE) | ......................... | 10 2008 012 426 |

(51) Int. Cl.

| | |
|---|---|
| ***G06K 9/54*** | (2006.01) |
| ***H04N 1/44*** | (2006.01) |
| ***B42D 15/00*** | (2006.01) |

(52) U.S. Cl.
USPC .............................. 382/306; 380/243; 283/73

(58) Field of Classification Search
USPC .. 382/100, 115–118, 173, 306, 284; 380/243; 283/72, 73, 75, 67, 74, 85
See application file for complete search history.

(56) References Cited

U.S. PATENT DOCUMENTS 2,970,131 A 1/1961 Moyer, Jr. et al.
2,991,273 A 7/1961 Hechelhammer et al.

(Continued)

FOREIGN PATENT DOCUMENTS

DE 1570703 A1 2/1970
DE 2063050 A1 7/1972

(Continued)

OTHER PUBLICATIONS

Schnell, H., "Chemistry and Physics of Polycarbonates", Interscience Publishers, A Division of John Wiley & Sons, New York, 1964, pp. 27-98.

(Continued)

*Primary Examiner* — Kanjibhai Patel
(74) *Attorney, Agent, or Firm* — Laurence A. Greenberg; Werner H. Stemer; Ralph E. Locher

(57) ABSTRACT

In the production of a document, image information is incorporated into a plurality of layers of the document such that the pieces of image information are combined into a total image. The image information in at least two of the layers includes digital watermark information. The entirety of the digital watermark information in the at least two layers forms a security feature for an authentication of the document. The invention further relates to a respective document, a method for authentication, and a device for authentication.

17 Claims, 3 Drawing Sheets

U.S. PATENT DOCUMENTS

| | | | | |
|---|---|---|---|---|
| 2,999,835 | A | 9/1961 | Goldberg | |
| 2,999,846 | A | 9/1961 | Schnell et al. | |
| 3,028,365 | A | 4/1962 | Schnell et al. | |
| 3,062,781 | A | 11/1962 | Bottenbruch et al. | |
| 3,148,172 | A | 9/1964 | Fox | |
| 3,271,367 | A | 9/1966 | Schnell et al. | |
| 3,275,601 | A | 9/1966 | Schnell et al. | |
| 5,350,198 | A | 9/1994 | Bernecker | |
| 5,734,800 | A | 3/1998 | Herbert et al. | |
| 6,022,429 | A | 2/2000 | Hagstrom | |
| 6,264,296 | B1 | 7/2001 | Klinefelter et al. | |
| 6,487,301 | B1 | 11/2002 | Zhao | |
| 6,663,945 | B2 | 12/2003 | Miyano | |
| 6,685,312 | B2 | 2/2004 | Klinefelter et al. | |
| 6,765,693 | B1 | 7/2004 | Chang | |
| 6,932,527 | B2 | 8/2005 | Pribula et al. | |
| 6,979,141 | B2 | 12/2005 | Karst et al. | |
| 7,005,003 | B2 | 2/2006 | Mott et al. | |
| 7,037,013 | B2 | 5/2006 | Klinefelter et al. | |
| 7,063,264 | B2 * | 6/2006 | Bi et al. | 235/487 |
| 7,286,682 | B1 | 10/2007 | Sharma et al. | |
| 7,389,939 | B2 * | 6/2008 | Jones et al. | 235/494 |
| 7,513,437 | B2 * | 4/2009 | Douglas | 235/492 |
| 7,529,385 | B2 * | 5/2009 | Lawandy et al. | 382/100 |
| 7,668,347 | B2 * | 2/2010 | Zhou | 382/118 |
| 7,733,223 | B2 * | 6/2010 | Levien et al. | 340/539.26 |
| 7,823,791 | B2 * | 11/2010 | Jones | 235/491 |
| 8,070,186 | B2 * | 12/2011 | Einhorn et al. | 283/94 |
| 8,087,772 | B2 * | 1/2012 | Jones et al. | 347/104 |
| 8,243,356 | B2 * | 8/2012 | Robertsson et al. | 359/267 |
| 2002/0080996 | A1 | 6/2002 | Rhoads | |
| 2003/0234286 | A1 | 12/2003 | Labrec et al. | |
| 2004/0007625 | A1 | 1/2004 | Kappe et al. | |
| 2004/0181671 | A1 | 9/2004 | Brundage et al. | |
| 2006/0197337 | A1 | 9/2006 | Merry et al. | |
| 2007/0026204 | A1 | 2/2007 | Caulley et al. | |

FOREIGN PATENT DOCUMENTS

| | | | |
|---|---|---|---|
| DE | 2063052 | A1 | 7/1972 |
| DE | 2211956 | A1 | 10/1973 |
| DE | 3832396 | A1 | 2/1990 |
| DE | 4134539 | A1 | 4/1993 |
| DE | 10047450 | A1 | 4/2002 |
| DE | 10154051 | A1 | 6/2002 |
| EP | 0131145 | B1 | 9/1987 |
| EP | 1398175 | A2 | 3/2004 |
| EP | 1698485 | A2 | 9/2006 |
| FR | 1561518 | A | 3/1969 |
| GB | 1122003 | A | 7/1968 |
| GB | 1229482 | A | 4/1971 |
| GB | 1341318 | A | 12/1973 |
| GB | 1367788 | A | 9/1974 |
| GB | 1367790 | A | 9/1974 |
| JP | 2000134460 | A | 5/2000 |
| JP | 2000182114 | A | 6/2000 |
| JP | 2001333265 | A | 11/2001 |
| JP | 2002142105 | A | 5/2002 |
| JP | 2003198830 | A | 7/2003 |
| JP | 2005191957 | A | 7/2005 |
| WO | 9957885 | A1 | 11/1999 |
| WO | 02098671 | A2 | 12/2002 |
| WO | 2007016148 | A2 | 2/2007 |

OTHER PUBLICATIONS

Booth et al., "Dyes, General Survey", Ullmann's Encyclopedia of Industrial Chemistry (UEIC), 2002 by Wiley-VCH Verlag GmbH & Co., pp. 1-61.

Hunger et al., "Pigments, Organic", Ullmann's Encyclopedia of Industrial Chemistry (UEIC), 2002 by Wiley-VCH Verlag GmbH & Co., pp. 1-66.

Voelz, H., "Pigments, Inorganic, 1. General", Ullmann's Encyclopedia of Industrial Chemistry (UEIC), 2009 by Wiley-VCH Verlag GmbH & Co., pp. 1-38.

Auer et al., "Pigments, Inorganic, 2. White Pigments" Ullmann's Encyclopedia of Industrial Chemistry (UEIC), 2009 by Wiley-VCH Verlag GmbH & Co., pp. 1-40.

Buxbaum et al., "Pigments, Inorganic, 3. Colored Pigments",Ullmann's Encyclopedia of Industrial Chemistry (UEIC), 2009 by Wiley-VCH Verlag GmbH & Co., pp. 1-49.

Leitner et al., "Pigments, Inorganic, 4. Magnetic Pigments", Ullmann's Encyclopedia of Industrial Chemistry (UEIC), 2009 by Wiley-VCH Verlag GmbH & Co., pp. 1-8.

Etzrodt, G., "Pigments, Inorganic, 5.Anticorrosive Pigments", Ullmann's Encyclopedia of Industrial Chemistry (UEIC), 2009 by Wiley-VCH Verlag GmbH & Co., pp. 1-22.

Pfaff et al., "Pigments, Inorganic, 6. Luster Pigments", Ullmann's Encyclopedia of Industrial Chemistry (UEIC), 2009 by Wiley-VCH Verlag GmbH & Co., pp. 1-17.

Gaedcke, H., "Pigments, Inorganic, 7. Transparent Pigments", Ullmann's Encyclopedia of Industrial Chemistry (UEIC), 2009 by Wiley-VCH Verlag GmbH & Co., pp. 1-5.

Winkelmann et al., "Imaging Technology", Ullmann's Encyclopedia of Industrial Chemistry (UEIC), 2003 by Wiley-VCH Verlag GmbH & Co., pp. 1-116.

Stoye et al., "Paints and Coatings", Ullmann's Encyclopedia of Industrial Chemistry (UEIC), 2006 by Wiley-VCH Verlag GmbH & Co., pp. 1-216.

Van Renesse, "Optical Document Security" 3rd Edition, Artech House, 2005 pp. 1-366.

* cited by examiner

SECURING OF DOCUMENTS BY MEANS OF DIGITAL WATERMARK INFORMATION

FIELD OF THE INVENTION

The invention relates to a method for producing a document, a document produced by the method, an authentication method for determining whether the document is authentic and an authentication device. The document is in particular a security and/or valuable document.

PRIOR ART AND BACKGROUND OF THE INVENTION

In many cases, security and/or valuable documents comprise individualizing (in particular personalizing) information which represents an assignment of the security and/or valuable document to an issuer, a group of persons or the person of the document owner. Suitable personalizing information is in particular image information, for example a passport image, a fingerprint or other biometric features, but also alphanumeric character sequences, such as names, address, place of residence or date of birth of the person.

Examples of security and/or valuable documents are personal identification documents, passports, identity (ID) cards, access control passes, visas, control characters, tickets, driving licenses, motor vehicle documents, banknotes, checks, postage stamps, credit cards, any chip cards and adhesive labels (e.g. for product security).

The prior art discloses various methods for producing valuable and/or security documents. For example, the publications U.S. Pat. Nos. 6,022,429, 6,264,296, 6,685,312, 6,932,527, 6,979,141 and 7,037,013 describe those methods in which an inkjet print which is to be protected with a protective lacquer or protective film as protection from mechanical and/or chemical damage and manipulations is applied to blanks. By means of these methods, personalizing and/or individualizing information can be stored by a printing process in color in the security and/or valuable document. However, the resulting security and/or valuable documents have only relatively little security against manipulations because the imprinted information is all printed relatively close to the surface and the protective layer comprising lacquer or protective film generally does not form a monolithic material bond to the card blank and is therefore detachable and/or removable. Subsequent manipulation of the printed matter is possible.

DE 41 34 539 A1 discloses a recording medium having colored image information, which is in particular a prepaid or identification card, and a method for production. The image information is divided into a light/dark component and a color component. The light/dark component, which is intended for the visual impression, is incorporated in highly resolved form into the recording medium. The colored image information is superposed in a congruent manner on this component so that an integral overall impression results. In order to ensure security against forgery, one of the components of the image information is incorporated into a card structure. Embodiments in which, for example, the light/dark information is incorporated by means of laser engraving into a transparent film which is applied to a printed inlay are described. The color component is printed on an ink-accepting layer applied to the film or on the transparent film. In another embodiment, the inlay is provided with the color components of the image information by an electrophotographic method. A thin transparent cover film into which the light/dark component of the image information is burned by means of a laser jet writer is then arranged over the colored fixed toner image. In a further embodiment, the inlay is provided with black/white information with the use of a conventional method, such as, for example, inkjet printing, and in the subsequent step is covered with a substantially transparent plastic film which is suitable for accepting migrating inks. The colored image components are incorporated into the depth of the cover layer by means of migrating inks. Here, the cover film can firstly be printed with the colored image information. Under the action of heat, the ink migrates into the interior of the cover layer until UV radiation initiates crosslinking of the cover layer which stops further migration. In yet another embodiment, the color information is first incorporated into the cover layer and light/dark information is then applied by conventional printing methods. Once again, the problem arises that the film used, under which or in which a part of the information is arranged, does not form a monolithic bond to the inlay, and can therefore be removed and/or replaced for forgery. In a number of the embodiments described, a part of the information is moreover applied directly on the surface and is particularly easily accessible to forgery and/or manipulation.

The publications U.S. Pat. No. 7,005,003 B2, EP 0 131 145 B1, U.S. Pat. No. 5,734,800 and U.S. Pat. No. 6,765,693 B1 describe processes for printing colored images with different color separations.

In particular, security documents are frequently issued by the issuer as a card whose supporting parts consist of plastic. Polycarbonate has proven particularly resistant. Such documents should in particular be protected from imitation or it should be possible to determine in a reliable manner that a certain copy was also actually issued by the alleged issuer.

For securing documents with image constituents, such as, for example, passport images or reproductions of passport images or images which refer not to the owner of the document but to the document type (e.g. special logos), it is known that digital watermarks can be incorporated into the image. The method for incorporating digital watermarks is based on a modification of the original image information. As a rule, the watermarks are pieces of information which are not perceptible or scarcely perceptible to the viewer. For example, US 2002/080996 A1 describes a method and systems for embedding binary data in security documents and associated methods and systems for detecting/decoding such data.

The document according to the present invention can be produced and/or structured for example as described in the preceding paragraphs and/or can have one or more of the abovementioned features.

Objects of the Invention

It is an object of the present invention to provide a method for producing a document which increases the protection from forgery. Furthermore, it is intended to provide a corresponding document. A further object of the present invention is to provide an authentication method for determining whether a document is authentic, and an authentication device.

Main Features of the Invention and Preferred Embodiments

According to a fundamental concept of the present invention, watermark information is incorporated into the image information of at least two different layers of a document and the watermark information is configured so that only the totality of the watermark information in the at least two layers forms a security feature for authentication of the document.

The term “layer” is understood as meaning a generally flat region in a document which is defined in a direction transverse to the plane or layer by its position in the document. For example, in a commercial card-like document, for example an identity card, the layer extends at a constant distance from the surface of the card.

A distinction should be made between the term "layer" and the term "substrate". In a customary card document, for example, a plurality of substrates or material strata are laminated with one another to give a material composite. In principle, it is possible for only a single stratum to contain two or even more than two layers in which image information for the overall image is present. In particular, a first layer may lie through a first surface of the substrate, a second layer through a second surface of the substrate on the opposite side and a third layer within the substrate. However, there may occur in practice that, for example when a surface is printed on, print materials also penetrate into the interior of the substrate. A stratum will therefore generally contain only a maximum of two layers with image information.

Some of the features of the invention which are described below relate to a production method, a document produced by the production method, to an authentication method and/or to an authentication device. If a feature relates to a plurality of such categories, but the feature is specifically described in more detail only in one category, the description accordingly also applies to the other categories.

The totality of the watermark information in the at least two layers can be formed in different ways. In other words, the totality of the watermark information can be divided into parts in different ways and incorporated into the individual layers. In the case of division, the watermark information can be provided with other, additional information so that the totality of the watermark information in these cases arises not merely by simple combination from the watermark information in the at least two layers. The additional information may be, for example, as will be described in more detail, information about where and/or in which layers other partial information of the totality is present and/or the procedure which is to be adopted in the evaluation of the partial information in order to obtain the totality of the watermark information.

Different procedures can be adopted not only in the evaluation but also in the acquisition of the watermark information present in the individual layers. Thus, in a first configuration, it is possible for only the pieces of watermark information in the individual layers to be acquired separately from one another and the totality of the watermark information to be formed therefrom according to specified instructions. In a particular configuration, however, an additional, summary acquisition of watermark information in at least two layers can take place. If, for example, the image information in a first layer is represented exclusively by a first color and the image information in a second layer is represented exclusively by a second, different color, the watermark information can be acquired from the individual layers by a color-selective acquisition. A summary acquisition of the watermark information in both layers is effected, for example, by a non-color-selective acquisition. The summary acquisition comprises as a rule less information than can be obtained by processing the information from different layers. The summarily acquired information from a plurality of layers may, however, also contain additional information which is not obtained by the acquisition of the information in the individual layers. A reason for this is that, depending on the acquisition method, the total information present in a layer is not acquired in all cases. For example, in the case of optical acquisition, one reason for this may be that further layers whose information is not to be acquired interfere with the acquisition and/or the acquisition is not sensitive for the entire spectrum. A further reason may be that a part of the information present in a layer can be acquired only when substances in the layer are excited by exposure to electromagnetic radiation of a certain wavelength and therefore emit a radiation of characteristic wavelength. The areas in which the fluorescent material is present are detectable only by means of such fluorescence.

In a particular configuration, the watermark information in at least one of the layers is incorporated only into a partial region of the image area. Image area is understood as meaning the area within a layer in which the image information is present. Since the watermark information is present only in the partial region, its discovery is difficult for a viewer not informed beforehand. For the informed viewer or user of reading devices, however, the acquisition and further processing of the watermark information is facilitated and improved by a knowledge of the partial region if the partial regions, in which watermark information is present, in different layers do not lie one on top of the other or at least do not lie completely one on top of the other. For example, it is possible to acquire and/or to evaluate the partial regions with the watermark information with a higher resolution than the other image regions. Moreover, the partial regions with the watermark information can be chosen so that their acquisition, in particular optical acquisition, from a direction which is perpendicular to the plane of the layer is not hindered by substrate material or print materials in other layers.

If, in at least one of the layers, the watermark information is incorporated only into a partial region of the image area, a particularly advantageous procedure is possible in which the watermark information in a first layer contains information relating to the partial region in the first layer or in a second layer in which other watermark information is arranged and/or the manner in which the watermark information in the second layer and/or in another partial region of the first layer is to be evaluated. Particularly if secret rules are defined as to how the watermark information in the first layer (which contains the additional information about the arrangement or evaluation) is to be evaluated, a potential forger cannot obtain the totality of the watermark information. For example, in the case of personalized documents, the watermark information, too, can be personalized. If the potential forger cannot detect the principle relating to the manner in which the personalization of the watermark information was carried out, he also cannot prepare a correctly personalized document for another person.

The watermark information is preferably digital watermark information which in particular is not perceptible or at least not perceptible to the untrained eye, i.e. the viewer cannot recognize that watermark information is present in the image when he views the image which is composed of the image information of the individual layers. Incorporation of watermark information into image information (in particular into image information which is incorporated into the document by digital printing) is known per se. A document which describes such methods was mentioned above. The production of watermark information and the incorporation of watermark information into image information therefore will not be discussed in more detail in the description of the present invention.

Preferably, the watermark information which is incorporated into different layers forms evaluatable authentication information only in its totality. In other words, the watermark information from only one layer or from not all layers and/or from not all partial regions in all layers in which watermark information is present is not sufficient for determining whether the document is authentic. Moreover, unless it is present in its totality, the watermark information cannot be evaluated, i.e. it is not possible to evaluate a part of the totality.

An evaluation is understood as meaning that a result can be obtained. An example of such a configuration is a totality of information which, inter alia, is evaluated by calculating a check sum from the totality. If a part of the totality is absent, the check sum cannot be calculated.

As this configuration shows, the invention is at least partly dependent on specified rules as to how to proceed with the total watermark information present in the document. Part of the method for producing a document is therefore, for example, also a step of the method in which the watermark information is first prepared, taking into account the evaluation instructions and/or the instructions for acquiring the watermark information from the document, so that, after incorporation of the watermark information into the document, acquisition and/or evaluation also actually leads to the desired result.

Apart from the configuration described above, however, the invention also comprises a configuration in which a subset of the totality of all watermark information incorporated into the document can also be evaluated. For example, information about the document owner, the issuer or the document (e.g. document number) can be obtained from the watermark information incorporated into a first layer or into a first partial region of any layer by evaluating this subset.

In a preferred configuration, the pieces of image information in the individual layers of the document are represented by a different color in each case. If, in a manner known per se, the basic colors of a color system or color space (such as red-green-blue, RGB, or cyan-magenta-yellow-black, CMYK) are used, preferably not more than one of the basic colors is used for each of the layers, at any rate if the image is a certain image which is formed by the color information in the individual layers.

The assignment of a color to the respective layer increases the protection from forgery since a unique assignment of the watermark information to the respective color is also established thereby. Moreover, the color can be used for selectively acquiring the watermark information of a certain layer, for example using color filters during the optical acquisition.

In a certain working example of the present invention, “colors” are also understood as meaning “gray shades”. For example, a dark gray shade is used in a first layer and a light gray shade in a second layer for the image information. However, this complicates the optical acquisition of the image information selectively in the individual layers.

The term colors is used in this description when the optical effect is described. If, on the other hand, the production of a printed image is described, print materials (e.g. inks) are referred to, which have the respective color.

The total image may be, for example, a passport image or a logo. In the context of this description, however, an image which is formed by image information in a plurality of layers is also understood as meaning any other configuration achievable by printing on a substrate. For example, text may be graphically configured and printed with multicolored letters.

In the document, in each case image information is incorporated or will be incorporated into a majority of layers so that the image information combines to form a total image. The positions of the layers are preferably defined by surfaces of different substrates.

For example, the total image information is divided into at least two print extracts which, for example, each contain partial information of the total image. Moreover, the watermark information is also embedded in the print extracts. The at least two print extracts are then printed on at least two different substrate surfaces so that the printed print extracts lie in register one on top of the other and together give the total image.

For example, the (in particular lamellar) substrates can be bonded to one another by lamination. In these cases, the at least two print extracts are printed in at least two planes a distance apart, but not necessarily on just as many different substrates as layers which contain image information.

The present invention relates in particular to a document which has a composite of polymer material strata, which may optionally additionally contain strata of other materials, for example of board or paper. The composite serves in particular for producing security and/or valuable documents.

In particular, the document may have a composite of polymer material strata which, for example, is welded into transparent protective films. In addition to the polymer material or materials, further elements and devices may be part of the document, for example a microchip and an antenna structure for wireless reading of the microchip. Furthermore, other substances, for example secret additives, may be introduced into the polymer material.

The image information may have been printed or may be printed in a manner known per se on individual layers of the document, in particular of the composite of polymer material strata. A preferred printing process is inkjet printing or another digital printing process, since documents can be individualized in a simple manner by digital printing, i.e. for example can be personalized for the person of the future document owner (for example by imprinting a passport image).

In principle, for example, all materials customary in the area of security and/or valuable documents can be used as materials for the polymer material strata. The polymer material strata may be formed, identically or differently, on the basis of a polymer material from the group consisting of PC (polycarbonate, in particular bisphenol A polycarbonate), PET (polyethylene glycol terephthalate), PMMA (polymethyl methacrylate), TPU (thermoplastic polyurethane elastomers), PE (polyethylene), PP (polypropylene), PI (polyimide or poly-trans-isoprene), PVC (polyvinyl chloride) and copolymers of such polymers. The use of PC materials is preferred, for example, but by no means necessarily, so-called low-$T_g$ materials also being usable, in particular for a polymer material stratum on which a print layer is applied, and/or for a polymer material stratum which is bonded to a polymer material stratum which carries a print layer, in particular on the side with the print layer. Low-$T_g$ materials are polymers whose glass transition temperature is below 140° C.

The polymer material strata may be used in filled or unfilled form. The filled polymer material strata contain in particular colored pigments or other fillers. The polymer material strata may also be colored with dyes or may be colorless and may be transparent or translucent in the latter case.

It is preferable if the base polymer of at least one of the polymer material strata to be bonded (in order to obtain the document or the composite of strata by lamination) contains identical or different groups which are reactive with one another, reactive groups of a first polymer material stratum reacting with one another and/or with reactive groups of a second polymer material stratum at a lamination temperature of less than 200° C. As a result, the lamination temperature can be reduced without endangering the intimate bonding of the laminated layers thereby. In the case of different polymer material strata having reactive groups, this is due to the fact that the different polymer material strata can no longer be directly delaminated owing to the reaction of the respective reactive groups. This is because reactive coupling takes place between the polymer material strata, so to speak reactive lamination. Furthermore, owing to the lower lamination temperature, it is possible to prevent a change in a colored print layer, in particular a color change. In particular, it is therefore also possible to accommodate in the printed image watermark information which is not detectable with the naked eye.

It is advantageous if the glass transition temperature $T_g$ of the at least one polymer material stratum is less than 120° C. (or even less than 110° C. or less than 100° C.) before the thermal lamination, the glass transition temperature of this polymer material stratum after thermal lamination being at least 5° C., preferably at least 20° C., higher as a result of reaction of reactive groups of the base polymer of the polymer material stratum with one another than the glass transition temperature before thermal lamination. Here, it is not only reactive coupling of the layers to be laminated with one another which takes place. Rather, the molecular weight and hence the glass transition temperature are increased by crosslinking of the polymer within the layer and between the layers. This additionally complicates any delamination since, for example, the printing inks will be irreversibly damaged in particular in a manipulation attempt due to the high delamination temperatures necessary and the document will be destroyed thereby. Preferably, the lamination temperature for the use of such polymer materials is less than 180° C., even more preferably less than 150° C. The choice of the suitable reactive groups is possible without problems for a person skilled in the art in the area of polymer chemistry. Exemplary reactive groups are selected from the group consisting of —CN, —OCN, —NCO, —NC, —SH, —$S_X$, -Tos, —SCN, —NCS, —H, -epoxy (—$CHOCH_2$), —$NH_2$, —$NN^+$, —NN—R, —OH, —COOH, —CHO, —COOR, -Hal (—F, —Cl, —Br, —I), -Me-Hal (Me=at least divalent metal, for example Mg), —$Si(OR)_3$, —$SiHal_3$, —$CH{=}CH_2$, and —COR", in which R" may be any desired reactive or unreactive group, for example H, Hal, $C_2$-$C_{20}$-alkyl, $C_3$-$C_{20}$-aryl, $C_4$-$C_{20}$-aralkyl, in each case branched or straight-chain, saturated or unsaturated, optionally substituted, or corresponding heterocycles having one or more identical or different heteroatoms N, O or S. Other reactive groups are of course possible. These include the reactants of the Diels-Alder reaction or of a metathesis.

The reactive groups may be bonded directly to the base polymer or may be linked via a spacer group to the base polymer. Suitable spacer groups are all spacer groups known to the person skilled in the art of polymer chemistry. The spacer groups may also be oligomers or polymers which impart resilience, with the result that a risk of breaking of the security and/or valuable document is reduced. Such resilience-imparting spacer groups are known to the person skilled in the art and therefore need not be described further here. Merely by way of example, mention may be made of spacer groups which are selected from the group consisting of $-(CH_2)_n-$, $-(CH_2-CH_2-O)_n-$, $-(SiR_2-O)_n-$, $-(C_6H_4)_n-$, $-(C_6H_{10})_n-$, $C_1$-$C_n$-alkylene-, —$C_3$-$C_{(n+3)}$-arylene-, —$C_4$—$C_{(n+4)}$-Aralkylene-, in each case branched or straight-chain, saturated or unsaturated, optionally substituted, or corresponding heterocycles having one or more, identical or different heteroatoms O, N or 5, where n=1 to 20, preferably 1 to 10. Regarding further reactive groups or possibilities for modification, reference is made to the literature "Ullmann's Encyclopaedia of Industrial Chemistry", Wiley Publishers, electronic edition 2006. In the above statements, the definition of the base polymer designates a polymer structure which carries no groups which are reactive under the lamination conditions used. They may be homopolymers or copolymers. With regard to said polymers, modified polymers are also included.

It is advantageous if the respective layers in a composite of polymer material strata are arranged on inner layers of the composite, i.e. layers which do not form the surface of the laminate. In this case, forgery or falsification of print layers serving as security features is more difficult or even ruled out. This is also advantageous for preserving the watermark information unchanged.

However, there is in this case the problem that conventional card-like data media can be relatively easily delaminated by manipulation. Where a security feature (for example at least a part of the total watermark information) is applied by printing processes to an inner layer of the composite of strata, can be detached by virtue of the fact that the print materials contain binders which at least substantially comprise the same polymer as the material of the strata of the composite of strata. In this case, the risk of delamination is virtually ruled out because a monolithic composite of the individual strata forms on lamination. If the print materials contain polycarbonate-based binders, it is particularly preferable if at least some of the strata of the composite likewise consist of polycarbonate. In the latter case, the print materials are printed on inner strata of the composite of strata, in particular all strata of the composite of strata which are adjacent to the print layers being formed from polycarbonate.

For printing on a composite comprising polycarbonate strata, in principle all inks customary in the field may be used. It is preferable to use as printing ink a preparation containing: A) from 0.1 to 20% by weight of a binder with a polycarbonate derivative, B) from 30 to 99.9% by weight of a preferably organic solvent or solvent mixture, C) from 0 to 10% by weight of a colorant or colorant mixture (% by weight, based on the dry mass thereof), D) from 0 to 10% by weight of a functional material or of a mixture of functional materials, E) from 0 to 30% by weight of additives and/or auxiliaries, or of a mixture of such substances, the sum of the components A) to E) always being 100% by weight. Such polycarbonate derivatives are highly compatible with polycarbonate materials, in particular with polycarbonates based on bisphenol A, such as, for example, Makrofol® films. In addition, the polycarbonate derivative used is stable to high temperature and shows no discolorations at all at temperatures up to 200° C. or more which are typical for lamination, with the result that the use of the low-$T_g$ materials described above is also not necessary. Specifically, the polycarbonate derivative may contain functional carbonate structural units of the formula (I)

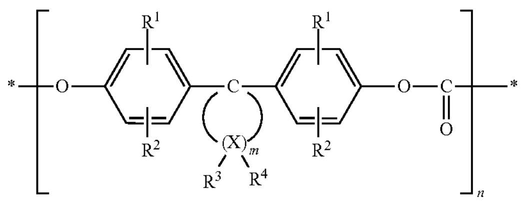

in which $R^1$ and $R^2$, independently of one another, are hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, in particular benzyl; m is an integer from 4 to 7, preferably 4 or 5; $R^3$ and $R^4$ are selectable individually for each X and, independently of one another, are hydrogen or $C_1$-$C_6$-alkyl; X is carbon and n is an integer greater than 20, with the proviso that, on at least one atom X, $R^3$ and $R^4$ are simultaneously alkyl. It is preferable if $R^3$ and $R^4$ are simultaneously alkyl on 1 or 2 atoms X, in particular only on one atom X. $R^3$ and $R^4$ may be in particular methyl. The X atoms in the α-position to the biphenyl-substituted C atom (C1) cannot be dialkyl-substituted. The X atoms in the β-position to C1 may be disubstituted by alkyl. Preferably, m is 4 or 5. The polycarbonate derivative may be based, for example, on monomers such as 4,4'-(3,3,5-trimethylcyclohexane-1,1-diyl)diphenol, 4,4'-(3,3-dimethylcyclohexane-1,1-diyl)diphenol or 4,4'-(2,4,4-trimethylcyclopentane-1,1-diyl)diphenol. Such a polycarbonate derivative can be prepared, for example, according to the literature reference DE-A 38 32 396 from diphenols of the formula (Ia), the disclosure content of which is hereby incorporated in its entirety into the disclosure content of this description. It is possible to use both a diphenol of the formula (Ia) with formation of homopolycarbonates and a plurality of diphenols of the formula (Ia) with formation of copolycarbonates (meaning of radicals, groups and parameters as in formula I).

(Ia)

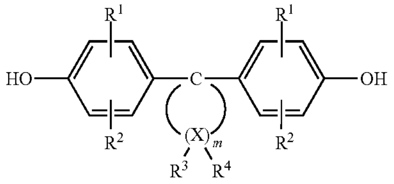

In addition, the diphenols of the formula (Ia) may also be used as a mixture with other diphenols, for example with those of the formula (Ib)

HO—Z—OH (Ib)

for the preparation of high molecular weight, thermoplastic, aromatic polycarbonate derivatives.

Suitable other diphenols of the formula (Ib) are those in which Z is an aromatic radical having 6 to 30 C atoms, which may contain one or more aromatic nuclei, may be substituted and may contain aliphatic radicals or cycloaliphatic radicals other than those of the formula (Ia) or heteroatoms as bridge members. Examples of the diphenols of the formula (Ib) are hydroquinone, resorcinol, dihydroxybiphenyls, bis(hydroxyphenyl)-alkanes, bis(hydroxyphenyl)cycloalkanes, bis(hydroxy-phenyl)sulfides, bis(hydroxyphenyl)ethers, bis(hydroxyphenyl)ketones, bis(hydroxyphenyl)sulfones, bis (hydroxyphenyl)sulfoxides, α,α'-bis(hydroxyphenyl) diisopropylbenzenes and the compounds thereof which are alkylated on the nucleus and halogenated on the nucleus. These and further suitable diphenols are described, for example, in U.S. Pat. Nos. 3,028,365, 2,999,835, 3,148,172, 3,275,601, 2,991,273, 3,271,367, 3,062,781, 2,970,131, 2,999,846, DE-A 1 570 703, DE-A 2 063 050, DE-A 2 063 052, DE-A 2 211 956, FR-A 1 561 518 and in H. Schnell in: "Chemistry and Physics of Polycarbonates", Interscience Publishers, New York 1964, the disclosure content of which is hereby incorporated in its entirety into the disclosure content of the present description. Examples of preferred other diphenols are: 4,4'-dihydroxybiphenyl, 2,2-bis(4-hydroxyphenyl) propane, 2,4-bis(4-hydroxyphenyl)-2-methylbutane, 1,1-bis (4-hydroxyphenyl) cyclohexane, α,α-bis(4-hydroxyphenyl)-p-diisopropylbenzene, 2,2-bis(3-methyl-4-hydroxyphenyl)-propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)cyclohexane, α,α-bis(3,5-dimethyl-4-hydroxy-phenyl)-p-diisopropylbenzene, 2,2-bis(3,5-dichloro-4-hydroxyphenyl) propane and 2,2-bis(3,5-dibromo-4-hydroxyphenyl)propane. Particularly preferred diphenols of the formula (Ib) are, for example, 2,2-bis(4-hydroxyphenyl) propane, 2,2-bis(3,5-dimethyl-4-hydroxy-phenyl)propane, 2,2-bis(3,5-dichloro-4-hydroxyphenyl)-propane, 2,2-bis(3,5-dibromo-4-hydroxyphenyl)propane and 1,1-bis(4-hydroxyphenyl)cyclohexane. In particular, 2,2-bis(4-hydroxyphenyl)propane is preferred. The other diphenols can be used either individually or as a mixture. The molar ratio of diphenols of the formula (Ia) to the other diphenols of the formula (Ib) which are optionally to be concomitantly used should be from 100 mol % of (Ia):0 mol % of (Ib) to 2 mol % of (Ia):98 mol % of (Ib), preferably from 100 mol % of (Ia):0 mol % of (Ib) to 10 mol % of (Ia):90 mol % of (Ib) and in particular from 100 mol % of (Ia):0 mol % of (Ib) to 30 mol % of (Ia):70 mol % of (Ib). The high molecular weight polycarbonate derivatives of the diphenols of the formula (Ia), optionally in combination with other diphenols, can be prepared by the known polycarbonate preparation processes. The various diphenols may be linked to one another both randomly and blockwise. The polycarbonate derivatives used may be branched in a manner known per se. If branching is desired, this can be achieved in a known manner by incorporation of small amounts, preferably of amounts of from 0.05 to 2.0 mol % (based on diphenols used), of compounds which are trifunctional or more than trifunctional, in particular those having three or more than three phenolic hydroxyl groups, by condensation. Some branching agents having three or more than three phenolic hydroxyl groups are phloroglucinol, 4,6-dimethyl-2,4,6-tri(4-hydroxy-phenyl)hept-2-ene, 4,6-dimethyl-2,4,6-tri(4-hydroxy-phenyl)heptane, 1,3,5-tri(4-hydroxyphenyl)benzene, 1,1,1-tri(4-hydroxyphenyl)ethane, tri (4-hydroxyphenyl)-phenylmethane, 2,2-bis[4,4-bis(4-hydroxyphenyl)cyclo-hexyl]propane, 2,4-bis(4-hydroxyphenylisopropyl)phenol, 2,6-bis(2-hydroxy-5-methylbenzyl)-4-methylphenol, 2-(4-hydroxyphenyl)-2-(2,4-dihydroxyphenyl)propane, hexa[4-(4-hydroxyphenylisopropyl)phenyl]orthoterephthalic acid ester, tetra(4-hydroxyphenyl)methane, tetra[4-(4 -hydroxyphenylisopropyl)phenoxy]methane and 1,4-bis[4',4"-dihydroxytriphenyl)methyl]benzene. Some of the other trifunctional compounds are 2,4-dihydroxy-benzoic acid, trimesic acid, cyanuric chloride and 3,3-bis(3-methyl-4-hydroxyphenyl)-2-oxo-2,3-dihydroindole. Monofunctional compounds in customary concentrates serve as chain terminators for regulating the molecular weight of the polycarbonate derivatives in a manner known per se. Suitable compounds are, for example, phenol, tert-butylphenols or other alkyl-substituted phenols. In particular, small amounts of phenols of the formula (Ic)

(Ic)

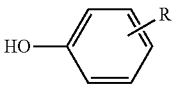

in which R is a branched $C_8$- and/or $C_9$-alkyl radical, are suitable for regulating the molecular weight. In the alkyl radical R, the proportion of $CH_3$ protons is preferably from 47 to 89% and the proportion of CH and $CH_2$ protons from 53 to 11%; also preferably R is in the o- and/or p-position to the OH group, and the upper limit of the ortho fraction is particularly preferably 20%. The chain terminators are used in general in amounts from 0.5 to 10, preferably from 1.5 to 8, mol %, based on the diphenols used. The polycarbonate derivatives can preferably be prepared according to the phase boundary behavior (cf. H. Schnell in: *Chemistry and Physics of Polycarbonates*, Polymer Reviews, Vol. IX, page 33 et seq., Interscience Publ. 1964) in a manner known per se. Here, the diphenols of the formula (Ia) are dissolved in the aqueous alkaline phase. For the preparation of copolycarbonates with other diphenols, mixtures of diphenols of the formula (Ia) and the other diphenols, for example those of the formula (Ib), are used. For regulating the molecular weight, chain terminators, for example of the formula (Ic), may be added. Reaction is then effected in the presence of an inert, preferably polycarbonate-dissolving, organic phase with phosgene by the phase boundary condensation method. The reaction temperature is in the range from 0° C. to 40° C. The optionally concomitantly used branching agents (preferably from 0.05 to 2.0 mol %) can either be initially introduced with the diphenols in the aqueous alkaline phase or added in solution in the organic solvent prior to phosgenation. In addition to the diphenols of the formula (Ia) and optionally other diphenols (Ib), the mono- and/or bischlorocarbonic acid esters thereof may also be concomitantly used, these being added in solution in organic solvents. The amount of chain terminators and of branching agents then depends on the molar amount of diphenolate radicals corresponding to formula (Ia) and optionally formula (Ib); with the concomitant use of chlorocarbonic acid esters, the amount of phosgene can be correspondingly reduced in a known manner. Suitable organic solvents for the chain terminators and optionally for the branching agents and the chlorocarbonic acid esters are, for example, methylene chloride, chlorobenzene and in particular mixtures of methylene chloride and chlorobenzene. Optionally, the chain terminators and branching agents used can be dissolved in the same solvent. For example, methylene chloride, chlorobenzene and mixtures of methylene chloride and chlorobenzene serve as the organic phase for the phase boundary polycondensation. For example, NaOH solution serves as the aqueous alkaline phase. The preparation of the polycarbonate derivatives by the phase boundary process can be catalyzed in a customary manner by catalysts such as tertiary amines, in particular tertiary aliphatic amines, such as tributylamine or triethylamine; the catalysts can be used in amounts of from 0.05 to 10 mol %, based on moles of diphenols used. The catalysts can be added before the beginning of the phosgenation or during or even after the phosgenation. The polycarbonate derivatives can be prepared by the known process in the homogeneous phase, the so-called "pyridine process", and by the known melt transesterification process with the use of, for example, diphenyl carbonate instead of phosgene. The polycarbonate derivatives may be straight-chain or branched; they are homopolycarbonates or copolycarbonates based on the diphenols of the formula (Ia). As a result of the arbitrary composition with other diphenols, in particular with those of the formula (Ib), the polycarbonate properties can be varied in an advantageous manner. In such copolycarbonates, the diphenols of the formula (Ia) are present in amounts of from 100 mol % to 2 mol %, preferably in amounts of from 100 mol % to 10 mol % and in particular in amounts of from 100 mol % to 30 mol %, based on the total amount of 100 mol % of diphenol units, in polycarbonate derivatives. The polycarbonate derivative may be a copolymer containing, in particular consisting of, monomer units M1 based on the formula (Ib), preferably bisphenol A, and monomer units M2 based on geminally disubstituted dihydroxydiphenyl-cycloalkane, preferably on 4,4'-(3,3,5-trimethylcyclo-hexane-1,1-diyl)diphenol, the molar ratio M2/M1 being preferably greater than 0.3, in particular greater than 0.4, for example greater than 0.5. It is preferable if the polycarbonate derivative has an average molecular weight (weight average) of at least 10 000, preferably from 20 000 to 300 000.

The component B may in principle be substantially organic or aqueous. Here, substantially aqueous means that up to 20% by weight of the component B) may be organic solvents. Substantially organic means that up to 5% by weight of water may be present in the component B). Preferably, the component B) contains or consists of a liquid aliphatic, cycloaliphatic and/or aromatic hydrocarbon, a liquid organic ester and/or a mixture of such substances. The organic solvents used are preferably halogen-free organic solvents. In particular, aliphatic, cycloaliphatic, aromatic hydrocarbons, such as mesitylene, 1,2,4-trimethylbenzene, cumene and solvent naphtha, toluene, xylene; (organic) esters, such as methyl acetate, ethyl acetate, butyl acetate, methoxypropyl acetate, ethyl 3-ethoxypropionate, are suitable. Mesitylene, 1,2,4-trimethylbenzene, cumene and solvent naphtha, toluene, xylene, methyl acetate, ethyl acetate, methoxypropyl acetate and ethyl 3-ethoxypropionate are preferred. Mesitylene (1,3,5-trimethylbenzene), 1,2,4-trimethyl-benzene, cumene (2-phenylpropane), solvent naphtha and ethyl 3-ethoxypropionate are very particularly preferred. A suitable solvent mixture comprises, for example, L1) from 0 to 10% by weight, preferably from 1 to 5% by weight, in particular from 2 to 3% by weight, of mesitylene, L2) from 10 to 50% by weight, preferably from 25 to 50% by weight, in particular from 30 to 40% by weight, of 1-methoxy-2-propanol acetate, L3) from 0 to 20% by weight, preferably from 1 to 20% by weight, in particular from 7 to 15% by weight, of 1,2,4-trimethylbenzene, L4) from 10 to 50% by weight, preferably from 25 to 50% by weight, in particular from 30 to 40% by weight, of ethyl 3-ethoxypropionate, L5) from 0 to 10% by weight, preferably from 0.01 to 2% by weight, in particular from 0.05 to 0.5% by weight, of cumene and L6) from 0 to 80% by weight, preferably from 1 to 40% by weight, in particular from 15 to 25% by weight, of solvent naphtha, the sum of the components L1 to L6 always being 100% by weight.

In detail, the preparation may contain: A) from 0.1 to 10% by weight, in particular from 0.5 to 5% by weight, of a binder with a polycarbonate derivative based on a geminally disubstituted dihydroxydiphenylcycloalkane, B) from 40 to 99.9% by weight, in particular from 45 to 99.5% by weight, of an organic solvent or solvent mixture, C) from 0.1 to 6% by weight, in particular from 0.5 to 4% by weight, of a colorant or colorant mixture, D) from 0.001 to 6% by weight, in particular from 0.1 to 4% by weight, of a functional material or a mixture of functional materials, E) from 0.1 to 30% by weight, in particular from 1 to 20% by weight, of additives and/or auxiliaries, or a mixture of such substances.

In principle, any desired colorant or colorant mixture is suitable as component C, if a colorant is to be provided. Colorant designates all color-imparting substances. This means that said colorants may be both dyes (an overview of dyes is given in Ullmann's Encyclopedia of Industrial Chemistry, Electronic Release 2007, Wiley Publishers, chapter "Dyes, General Survey") and pigments (an overview of organic as well as inorganic pigments is given in Ullmann's Encyclopedia of Industrial Chemistry, Electronic Release 2007, Wiley Publishers, chapter "Pigments, Organic" or "Pigments, Inorganic"). Dyes should be soluble or dispersible or suspendable (in a stable manner) in the solvents of the component B). Furthermore, it is advantageous if the colorant is stable, in particular color-stable, at temperatures of 160° C.

or more for a period of more than 5 min. It is also possible that the colorant is subjected to a specified and reproducible color change under the processing conditions and is chosen accordingly. In addition to the thermal stability, pigments must in particular be present in very fine particle size distribution. For an inkjet print, this means in practice that the particle size should not be above 1.0 μm, since otherwise blockages in the printing head are the result. As a rule, nanoscale solid-state pigments and dissolved dyes have proven useful. The colorants may be cationic, anionic or neutral. The following may be mentioned merely as examples of colorants which may be used in inkjet printing: brilliant black C.I. No. 28440, chromogen black C.I. No. 14645, direct deep black E C.I. No. 30235, fast black salt B C.I. No. 37245, fast black salt K C.I. No. 37190, Sudan black HB C.I. 26150, naphthol black C.I. No. 20470, Bayscript® black liquid, C.I. Basic Black 11, C.I. Basic Blue 154, Cartasol® turquoise K-ZL liquid, Cartasol® turquoise K-RL liquid (C.I. Basic Blue 140), Cartasol blue K5R liquid. Furthermore suitable, for example, are the commercially available dyes Hostafine® black TS liquid (marketed by Clariant GmbH, Germany), Bayscript® black liquid (C.I. mixture, marketed by Bayer AG, Germany), Cartasol® black MG liquid (C.I. Basic Black 11, registered trademark of Clariant GmbH, Germany), Flexonylschwarz® PR 100 (E C.I. No. 30235, marketed by Hoechst AG), rhodamine B, Cartasol® Orange K3 GL, Cartasol® Yellow K4 GL, Cartasol® K GL or Cartasol® Red K-3B. Furthermore, anthraquinone, azo, quinophthalone, coumarin, methine, perinone and/or pyrazole dyes, for example available under the brand name Macrolex®, may be used as soluble colorants. Further suitable colorants are described in the literature reference Ullmann's Encyclopedia of Industrial Chemistry, Electronic Release 2007, Wiley Publishers, chapter "Colorants Used in Ink Jet Inks". Readily soluble colorants lead to optimal integration into the matrix or the binder of the print layer. The colorants may be added either directly as dye or pigment or as paste, a mixture of dye and pigment together with a further binder. This additional binder should be chemically compatible with the further components of the preparation. If such a paste is used as a colorant, the stated amount of the component B is based on the colorant without the other components of the paste. These other components of the paste are then to be subsumed under the component E. With the use of so-called colored pigments in the scale colors cyan-magenta-yellow and preferably also (carbon) black, solid color images are possible.

The component D comprises substances which are directly visible to the human eye with the use of technical aids or are visible by using suitable detectors. Here, the relevant materials known to the person skilled in the art (cf. also van Renesse in: "Optical document security", $3^{rd}$ Ed., Artech House, 2005) are meant, which are used for protecting valuable and security documents. These include luminescent substances (dyes or pigments, organic or inorganic) such as, for example, photoluminophores, electroluminophores, antistokes luminophores, fluorophores, but also magnetizable, photoacoustically addressable or piezoelectric materials. Furthermore, Raman-active or Raman-enhancing materials can be used, as can so-called barcode materials. Here too, either the solubility in the component B or, in the case of pigmented systems, the particle sizes of <1 μm and a thermal stability if a temperature is >160° C. are considered to be preferred criteria in the context of the statements for component C. Functional materials may be added directly or via a paste, i.e. to a mixture with a further binder, which then forms a constituent of the component E, or to the binder of component A which is used.

In the case of inks, for an inkjet print, the component E usually comprises prepared substances, such as antifoams, adjusting agents, wetting agents, surfactants, flow agents, drying agents, catalysts, (light) stabilizers, preservatives, biocides, surfactants, organic polymers for viscosity adjustment, buffer systems, etc. Suitable adjusting agents are adjusting salts customary in the field. An example of this is sodium lactate. Suitable biocides are all commercially available preservatives which are used for inks. Examples of these are Proxel® GXL and Parmetol® A26. Suitable surfactants are all commercially available surfactants which are used for inks. Amphoteric or nonionic surfactants are preferred. However, it is of course also possible to use specific anionic or cationic surfactants which do not change the properties of the dye. Examples of suitable surfactants are betaines, ethoxylated diols, etc. Examples are the product series Surfynol® and Tergitol®. Particularly when used for inkjet printing, the amount of surfactants is chosen, for example, with the proviso that the surface tension of the ink is in the range from 10 to 60 mN/m, preferably from 20 to 45 mN/m, measured at 25° C. It is possible to prepare a buffer system which stabilizes the pH in the range from 2.5 to 8.5, in particular in the range from 5 to 8. Suitable buffer systems are lithium acetate, borate buffers, triethanolamine or acetic acid/sodium acetate. A buffer system is suitable in particular in the case of a substantially aqueous component B. For adjusting the viscosity of the ink, (optionally water-soluble) polymers can be provided. All polymers suitable for customary ink formulations are suitable here. Examples are water-soluble starch, in particular having an average molecular weight of from 3000 to 7000, polyvinylpyrrolidone, in particular having an average molecular weight of from 25 000 to 250 000, polyvinyl alcohol, in particular having an average molecular weight of from 10 000 to 20 000, xanthan gum, carboxy-methylcellulose, ethylene oxide/propylene oxide block copolymer, in particular having an average molecular weight of from 1000 to 8000. An example of the last-mentioned block copolymer is the product series Pluronic®. The proportion of biocide, based on the total amount of ink, may be in the range from 0 to 0.5% by weight, preferably from 0.1 to 0.3% by weight. The proportion of surfactant, based on the total amount of ink, may be in the range from 0 to 0.2% by weight. The proportion of adjusting agents may be, based on the total amount of ink, from 0 to 1% by weight, preferably from 0.1 to 0.5% by weight. The auxiliaries also include other components, such as, for example, acetic acid, formic acid or N-methylpyrrolidone or other polymers from the dye solution or paste used. Regarding substances which are suitable as component E, reference is additionally made, for example, to Ullmann's Encyclopedia of Chemical Industry, Electronic Release 2007, Wiley Publishers, chapter "Paints and Coatings", section "Paint Additives".

The ink composition described above is suitable in particular for inkjet printing but may also be used for any other printing techniques, provided that the ratio of the individual components is adapted to the application. What is important in this context is that the composition described contains a polycarbonate derivative as a binder if the polymer material strata of the composite likewise consist of polycarbonate.

Very generally, independently of whether the print materials described above (in particular inks) are used or not, it is preferable if the image information is formed at least in one of the layers which has watermark information, by pixels (image elements) of an inkjet print. Such a printed image is particularly suitable for incorporating digital watermarks into image information. For example, the watermark can be incorporated into the image information by changing the shape, size and/or composition of pixels of the printed image. For example, an image dot which is part of the watermark information can be coded by a pixel which is composed of a multiplicity of partial areas in predefined form and/or size. If a pixel has a different shape, for example it does not belong to the watermark information.

Working examples of the invention will now be described with reference to the attached drawing. The individual figures of the drawing show:

DESCRIPTION OF THE INVENTION

Figure 1:
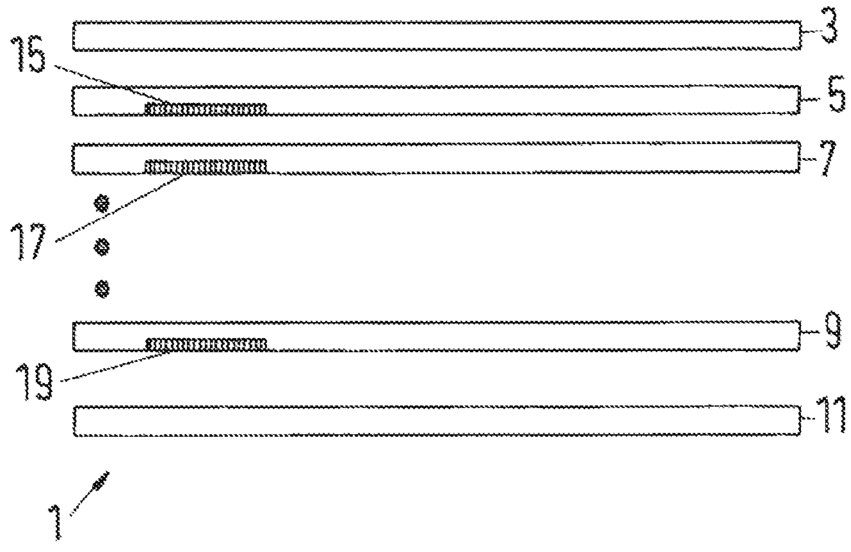
FIG. 1 strata of a document in an exploded diagram from the side.

FIG. 1 shows five strata 3, 5, 7, 9, 11 of a document 1 as an exploded diagram from the side, i.e. the uppermost stratum 3 and the lowermost stratum 11 form the outer surfaces of the document 1. The diagram may also be understood as a representation of an intermediate step in the production of the document 1. In this case, FIG. 1 shows the state immediately before the lamination of the strata 3-11.

Three inner strata 5, 7, 9 of the document 1 each have a partial region 15, 17, 19 on their lower surface. In each case image information in the form of a printed image, preferably of an inkjet printed image, is printed in these partial regions 15, 17, 19. Preferably, each of the printed images is executed in a single primary color of a multicomponent color system, e.g. RGB or CMYK. As shown by three dots arranged one below the other on the left in FIG. 1, which are present between the stratum 7 and the stratum 9, the document may have yet further strata which can likewise be printed in partial regions, for example with the lacking fourth color of the CMYK color space.

The printed partial regions 15, 17, 19 are positioned in the strata 5, 7, 9 and arranged one on the other prior to lamination in such a way that the printed images in the partial regions 15, 17, 19 give a total image when the outer surface of the document 1 is viewed (from below and/or from above). In the case of the color systems mentioned, the total image is therefore generally multicolored.

At least two of the partial regions 15, 17, 19 each contain watermark information in the printed image. The watermark information is preferably in the form of information of a digital watermark which is not perceptible to a viewer or is perceptible only with technical aids.

Figure 2:
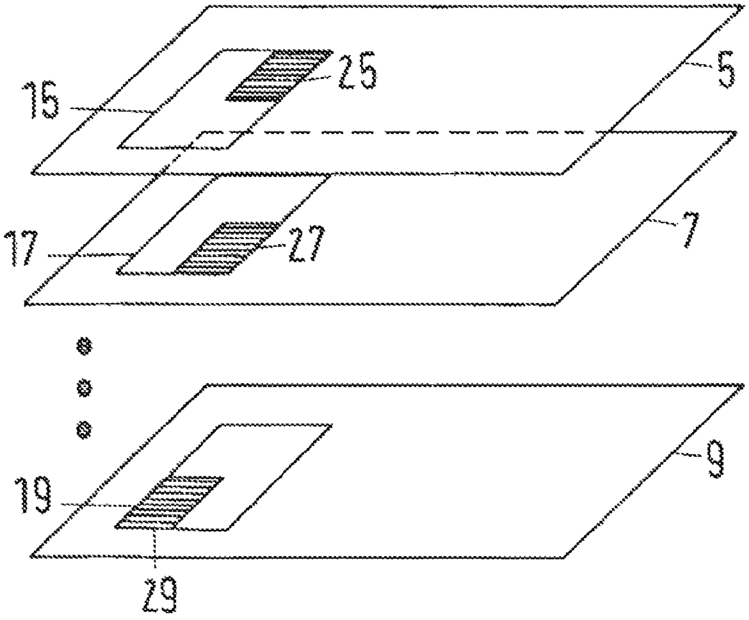
FIG. 2 strata of a document in a perspective exploded diagram.

The strata 5, 7, 9 shown in FIG. 2 may be, for example, the strata of the document 1 according to FIG. 1. These strata in turn have a partial region 15, 17, 19 on which image information is printed. In the working example shown here, each of the regions 15, 17, 19 has a partial region 25, 27, 29 which contains watermark information. Outside these partial regions 25, 27, 29, image information is likewise present but no watermark information. As likewise shown in FIG. 2, these partial regions 25, 27, 29 do not lie one on top of the other after lamination of the strata 5, 7, 9 in register. Even if the inexpert viewer or potential forger should recognize a watermark when he views the surface of the document 1, it is not evident to him that the total watermark information is distributed over the three layers of the strata 5, 7, 9. For example, in the case of a thickness of the strata 5, 7, 9 of about 50 μm, it is not possible, without prior knowledge (for example about the assignment of the colors to the layers), to recognize that the watermark information is distributed over the layers. The same of course also applies to the case where watermark information is arranged in different layers so that it lies one on top of the other. For example, the partial regions 25, 27, 29 could completely or partly overlap, it being assumed by the term overlap that the regions 15, 17, 19 in the diagram of FIG. 2 are viewed from above or below.

Working examples for the evaluation of the watermark information are now described with reference to FIG. 3 and FIG. 4. Even if only the evaluation and the acquisition of the watermark information are described here, this provides direct indications as to how the document will be produced or is produced with regard to the incorporation of the watermark information.

Figure 3:
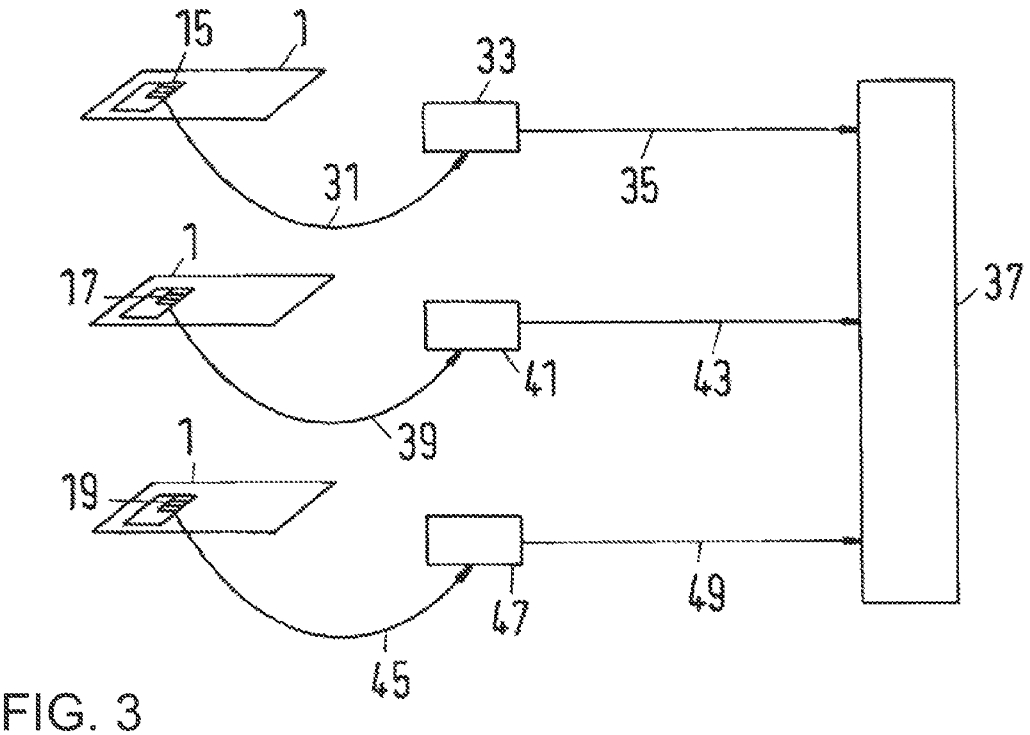
FIG. 3 a flow diagram for representing a first working example of a method for authenticating a document, FIG. 4 a flow diagram for representing a further working example of an authentication method and FIG. 5 a diagram of a further security feature which is based on a predefined, intentionally blurred representation of image objects.

FIG. 3 shows, at the top left of the picture, a document 1 which may be, for example, the document described in FIG. 1 and/or FIG. 2. In a first step 31, first watermark information is acquired from a printed image 15 of the document 1. For example, the total image information in the printed image 15 is first acquired. However, this is only the image information in a first layer of the document 1. For example, the total printed image in the layer is printed in a single color (e.g. yellow). The watermark information can then be extracted from the printed image by methods known per se, for example with the use of specified evaluation instructions. The extraction of the first watermark information is shown in FIG. 3 by the block 33.

In a following step 35, the first watermark information is subjected to an evaluation 37. However, only a part of the total watermark information which is contained in the document 1 is present therewith.

When this patent application refers to a total image which is formed by image information in a plurality of layers, the image need not be an image in a continuous area. Rather, the invention also covers cases where a plurality of images or partial images are distributed over the document area offered to the viewer. Moreover, the watermark information may be distributed over these several images or partial images.

In step 39, image information which likewise contains watermark information is acquired from a second layer in which the printed image 17 is present. Thus, for example in the manner already described, second watermark information is obtained in step 41 and is subjected to the evaluation 37 in step 43.

As shown at the bottom in FIG. 3, image information from a printed image 19 is additionally acquired (step 45) from a third layer of the document 1, third watermark information is extracted (step 47) and the third watermark information is subjected to the evaluation 37 in step 49.

The functioning of the evaluation 37 which serves for determining whether the document 1 is authentic or not will be discussed in more detail after FIG. 4 has been described.

There are numerous variants of the procedure described with reference to FIG. 3. For example, the watermark information can be extracted from a different number of layers (e.g. two or four layers of the document 1). The image regions in which the watermark information is present in the individual layers may completely or partly overlap or they may not overlap one another. Furthermore, the total information required for the authentication may not be present exclusively in the image composed of the partial printed images in the individual layers. Rather, further information present in the document may be combined together with the watermark information present in the image to give total information, only this total information permitting the decision as to whether the document is authentic. Examples of how further information may be present in the document are digital data memories (e.g. a memory chip) and optically recognizable information which optionally may also be coded, e.g. in the MRZ (machine readable zone).

Figure 4:
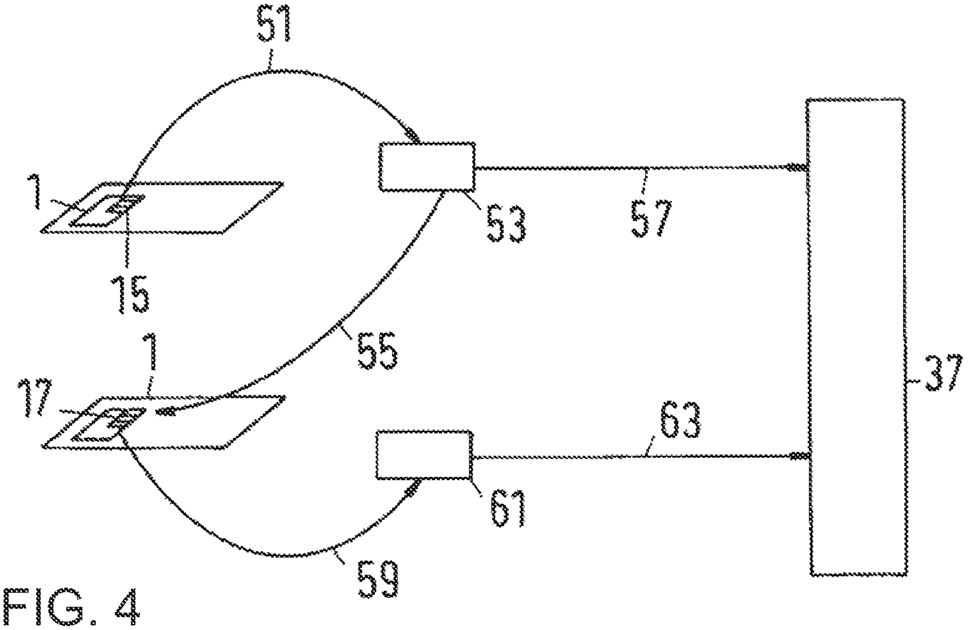

FIG. 4 shows a working example with evaluation of printed image information in only two different layers of a document 1. In a first step, printed image information is acquired from a printed image 15 in a first layer (step 51). In step 53, first watermark information is extracted therefrom. The procedure differs from the procedure according to FIG. 3 in that, in step 55, information obtained from the first watermark information is used for controlling the acquisition and/or evaluation of further watermark information. For example, the first watermark information contains information about where second watermark information is to be acquired in the document, i.e. for example in which partial region of which layer of the document 1 the second watermark information is present. The layer may be defined by the assigned color.

In step 59, image information is acquired using the information from step 55 in a second layer with a printed image 17, and the second watermark information sought is extracted in step 61.

Like the printed images 15, 17, 19 according to FIG. 3, the printed images 15, 17 according to FIG. 4 can, in a preferred configuration, each be formed from a single color of a color system. It has already been mentioned above regarding printed image 15 in FIG. 3 that the printed image is formed, for example, from yellow print materials. The printed images 17 according to FIG. 3 and FIG. 4 are accordingly, for example, formed from magenta print materials.

The first and second watermark information extracted in steps 53, 61 are subjected to the evaluation 37 in the steps 57, 63.

Moreover, the procedure described with reference to FIG. 4 may be modified. In particular, it may also be combined with the procedure described with reference to FIG. 3. Thus, for example, it is possible both to acquire and to extract watermark information from different layers completely independently of one another and to use watermark information of individual layers to find, to acquire and to extract watermark information in other layers. Furthermore, in the evaluation 37, which is still to be described in more detail, watermark information from individual partial regions or individual layers can be used for controlling the evaluation of watermark information from other layers or the total watermark information.

In a simple case, the procedure in the evaluation 37 is as follows: As shown in FIG. 3, each of the pieces of watermark information in the individual layers contains a digital watermark which contains a separate piece of information independent of the other watermarks. For example, the name of the document owner is determined from the first watermark information, the date of birth of the document owner is determined from the second watermark information and the document number is determined from the third watermark information. These pieces of information can now be compared with those from the plain text on the document or, for example, information obtained from the MRZ of the document. If, for example, name, date of birth or document number do not agree, the document is not authentic.

Very generally, it is true in the case of the present invention that the watermark information can be encrypted so that it can be obtained from the watermark only with a knowledge of the key. For example, a cryptographic hash function can also have been used for producing the watermark information, so that the original information on which the watermark is based cannot be derived from the watermark information. In this case, for example, the original information is likewise used in the evaluation for producing comparative information for verifying the authenticity with the use of the hash function. Furthermore, the information contained in the watermark may have been signed, for example, with an issuer's signature in order unambiguously to show the origin.

In another variant of the evaluation of the total watermark information, the total information may be composed, for example, of the sum of the individual pieces of watermark information or of another specified logic operation of the individual watermark information. For example, bit sequences obtained from the first, second and third watermarks according to FIG. 3 can be arranged in series in a specified manner so that a single total bit sequence is obtained.

According to a further possibility for evaluation, when the evaluation in this case is also to be understood as meaning the acquisition and extraction of the individual watermark information, watermark information already extracted is used (as mentioned above) for controlling, for example, the decryption of watermark information, the sequence of the extraction of watermark information and/or the evaluation of further watermark information in the same document and/or for determining redundant information. The watermark information already extracted can also predetermine the evaluation method to be used (for example, transformation from the color amplitude space into the frequency space).

The abovementioned cases may in each case be cases where the pieces of information present in the individual pieces of watermark information are independent pieces of information which can therefore be evaluated by themselves. However, it is also possible that total information which can be evaluated will be obtained only after the acquisition and extraction of a majority of the pieces of watermark information in various partial regions of the same layer and/or in different layers. The partial information which is combined to give the total information which can be evaluated can, as mentioned, be assigned in each case to a color and/or layer.

Mixed forms in which a part of the watermark information (e.g. the watermark information in the layer to which the color yellow is assigned) can be evaluated by itself and independently of the further watermark information and watermark information from other levels (for example a second level to which the color magenta is assigned and a third level to which the color cyan is assigned) can be evaluated only when the total information from both layers or a plurality of layers is present are also possible. It is also possible to configure the mixed forms so that an already extracted part of the total watermark information of all layers controls the acquisition, extraction and/or evaluation. "Control" is not understood as meaning that the information inevitably controls the process alone. Rather, it is understood as meaning that, for example, software controls the process with the use of the watermark information already extracted.

A further concept which is to be described here can be combined with the above-described concept for incorporating watermark information into a plurality of layers of a document or can also be implemented independently thereof in practice.

The concept starts from the problem that nowadays forgers too have very high-resolution optical scanners. In order to be able to provide a further security feature in a document, it is proposed to incorporate into the document information which in principle is optically readable (for example a character symbol or another symbol, a logo or a graphic, a barcode and/or a watermark, in particular digital watermark) in blurred form according to the specified instructions. Blurred is understood as meaning that the color intensity curve at the edge of the object to be printed in each case (symbol, etc., see above) falls off more slowly, i.e. over a greater length to zero or to another intensity value than is the case with the information without the blurring operation.

In the extreme case, this blurring operation may result in the information no longer being recognized by the viewer. For example, it is conceivable to form intensity maxima and minima of a printing ink on the document in a geometrical distribution similar to that in a guilloche pattern, the intensity maxima being present, for example, where the guilloche lines usually run and the intensity minima being present, for example, where the middle between two guilloche lines is usually present.

If the intensity maximum is chosen to be sufficiently low and the blurring is chosen to be sufficiently great, i.e. the transition from intensity maximum to intensity minimum takes place with little decrease in the intensity per length unit, the pattern thus achieved or the information thus achieved is not recognizable in the document or is recognizable only as shading.

After the optical acquisition of the printed image, the original information can be calculated utilizing the knowledge of how the original information was changed by the blurring operation. For example, by the use of threshold values for the color intensity along an evaluation direction, the point when a threshold value is reached or exceeded or is reached or not reached is determined and the location at which the threshold value is reached, not reached or exceeded is defined as an edge of an area to be identified. A further possibility consists in determining the intensity curve along an evaluation direction, for example by calculating the intensity gradient as a function of the location, and calculating a corresponding printed image in which the intensity curve is substantially steeper.

The intensity can be varied in particular by printing more or fewer (and/or larger or smaller) pixels of one color per unit area in a digital print.

This concept of the blurring operation will now be combined with one or more features of the invention as described above in relation to the arrangement of image information in different layers of a document. The image information need not necessarily also contain watermark information. However, it is possible for at least one layer also to contain watermark information.

It is now proposed to perform the blurring operation only in one or more, but not all, layers which contain image information for a total image.

Figure 5:
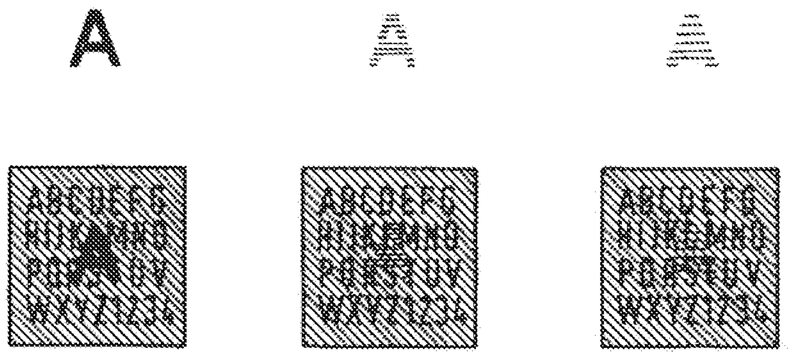

A working example is shown in FIG. 5. The upper part of the figure shows the letter "A" sharply represented on the left, after the application of a first blurring operation in the middle and after application of a second blurring operation on the right, the first blurring operation leading to less blurring than the second blurring operation.

The lower part of FIG. 5 shows a total printed image in each case for one of the three representations of the letter "A" in the upper part, the letter "A" being printed in a first layer of a document and the alphabet likewise recognizable in FIG. 5 at the bottom, additionally with the digits 1 to 4, being printed in a second level different from the first level. The different levels or layers can each once again be assigned a color of a color system. If, for example, the letter "A" is printed in the color yellow and the alphabet in the color black, the letter "A" will be even more poorly recognizable if the second blurring operation was applied to it (bottom right in FIG. 5).

As indicated by the diagonal shading in the lower part of FIG. 5, additional shading which even further reduces the recognizability of the letter "A" can be printed, for example, in the layer of the letter "A" or in the layer of the alphabet or in a further layer of the document.

It is also possible to incorporate the information which was subjected to the blurring operation into a layer of a multilayer printed image in which sharply printed information is also present.

The invention claimed is:

1. A method of producing a document, the method which comprises:

incorporating image information into a plurality of layers of the document, with the image information combining to provide a total image;

the image information in at least two of said layers containing digital watermark information; and only a totality of the digital watermark information in said at least two layers forming a security feature for authentication of the document;

forming each of a plurality of adjacent strata of the document by a polymer material and firmly bonding the adjacent strata to one another, with the strata forming a composite of polymer material strata and at least two of the adjacent strata comprising polycarbonate material; and printing image information onto surfaces of the layers and thereby forming the image information on at least one of the layers by print materials containing polycarbonate-based binder.

2. The method according to claim 1, which comprises incorporating the watermark information in at least one of said layers into a partial region of an image area.

3. The method according to claim 2, wherein the digital watermark information in a first layer contains information with regard to a partial region in which other watermark information is disposed in the first layer or in a second layer.

4. The method according to claim 1, wherein the watermark information in a first layer contains information with regard to how watermark information in a second layer and/or in another partial region of the first layer is to be evaluated.

5. The method according to claim 1, wherein the watermark information incorporated into different layers forms evaluatable authentication information only in a totality thereof.

6. The method according to claim 1, which comprises incorporating the watermark information in different layers in such a way that, in a case of nonselective optical acquisition of the image information, based on a single layer, said watermark information forms a first piece of total information and, on selective optical acquisition of the image information, based on the individual layers, forms a second piece of total information which is different from the first piece of total information.

7. The method according to claim 1, wherein the image information in the individual layers of the document is represented in each case by a different color.

8. The method according to claim 1, which comprises forming the image information at least in one of the layers having the watermark information by inkjet-printed pixels.

9. An article of manufacture, comprising:

a plurality of layers forming the document, each of said layers having image information incorporated therein and said image information combining to form a total image;

said image information in at least two of said layers containing watermark information; and only a totality of the watermark information in said at least two layers forming a security feature for authentication of the document;

wherein a plurality of adjacent strata of the document are formed in each case by a polymer material and said adjacent strata are firmly bonded to one another and said strata form a composite of polymer material strata, at least two of said adjacent strata comprising polycarbonate material; and wherein the image information is printed image information on at least one of said layers with print materials containing polycarbonate-based binder.

10. The article of manufacture according to claim 9, wherein, in at least one of said layers, watermark information is incorporated into a partial region of an image area.

11. The article of manufacture according to claim 10, wherein the watermark information in a first layer contains information as to the partial region in which other watermark information is arranged in the first layer or in a second layer.

12. The article of manufacture according to claim 9, wherein the watermark information in a first layer contains information as to how watermark information in a second layer and/or in another partial region of said first layer is to be evaluated.

13. The article of manufacture according to claim 9, wherein the watermark information incorporated into mutually different layers forms evaluatable authentication information only in a totality thereof.

14. The article of manufacture according to claim 9, wherein the watermark information in different layers is incorporated in such a way that, on nonselective optical acquisition of the image information, based on a single said layer, the watermark information forms a first piece of total information and, on selective optical acquisition of the image information, based on the individual said layers, forms a second piece of total information that is different from the first piece of total information.

15. The article of manufacture according to claim 9, wherein the image information in the individual said layers of the document is represented by in each case a different color.

16. The article of manufacture according to claim 9, wherein the image information at least in one of said at least two layers having the watermark information is formed by pixels of an inkjet print.

17. A method of producing a document, the method which comprises:

incorporating image information into a plurality of layers of the document, with the image information combining to provide a total image;

the image information in at least two of said layers containing digital watermark information;

only a totality of the digital watermark information in said at least two layers forming a security feature for authentication of the document;

incorporating the watermark information in different layers in such a way that, in a case of nonselective optical acquisition of the image information, based on a single layer, said watermark information forms a first piece of total information and, on selective optical acquisition of the image information, based on the individual layers, forms a second piece of total information which is different from the first piece of total information.

* * * * *